F. J. TROLL.
LOAD INDICATOR FOR VEHICLES.
APPLICATION FILED MAR. 8, 1916.
1,227,506.
Patented May 22, 1917.
2 SHEETS—SHEET 2.
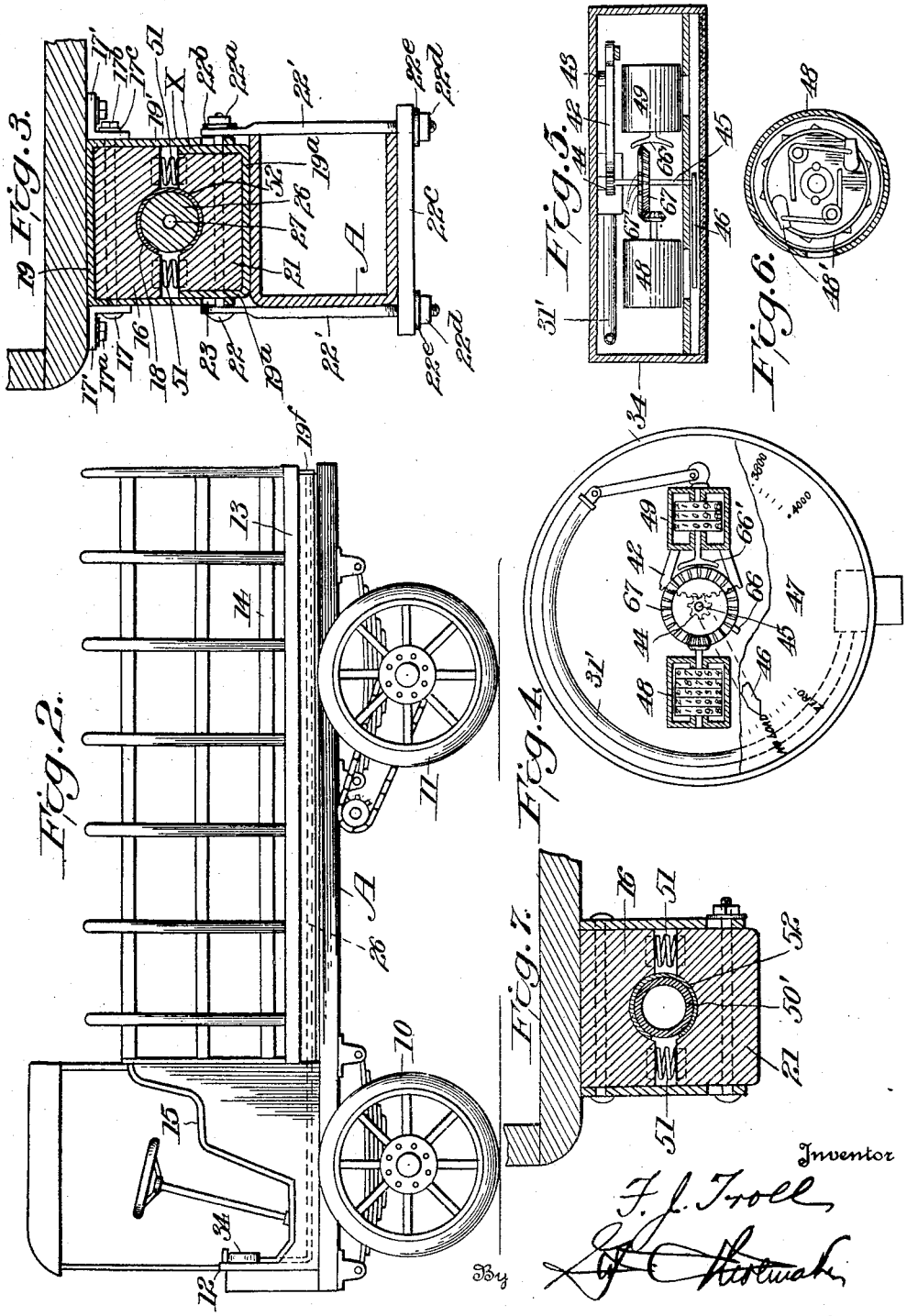

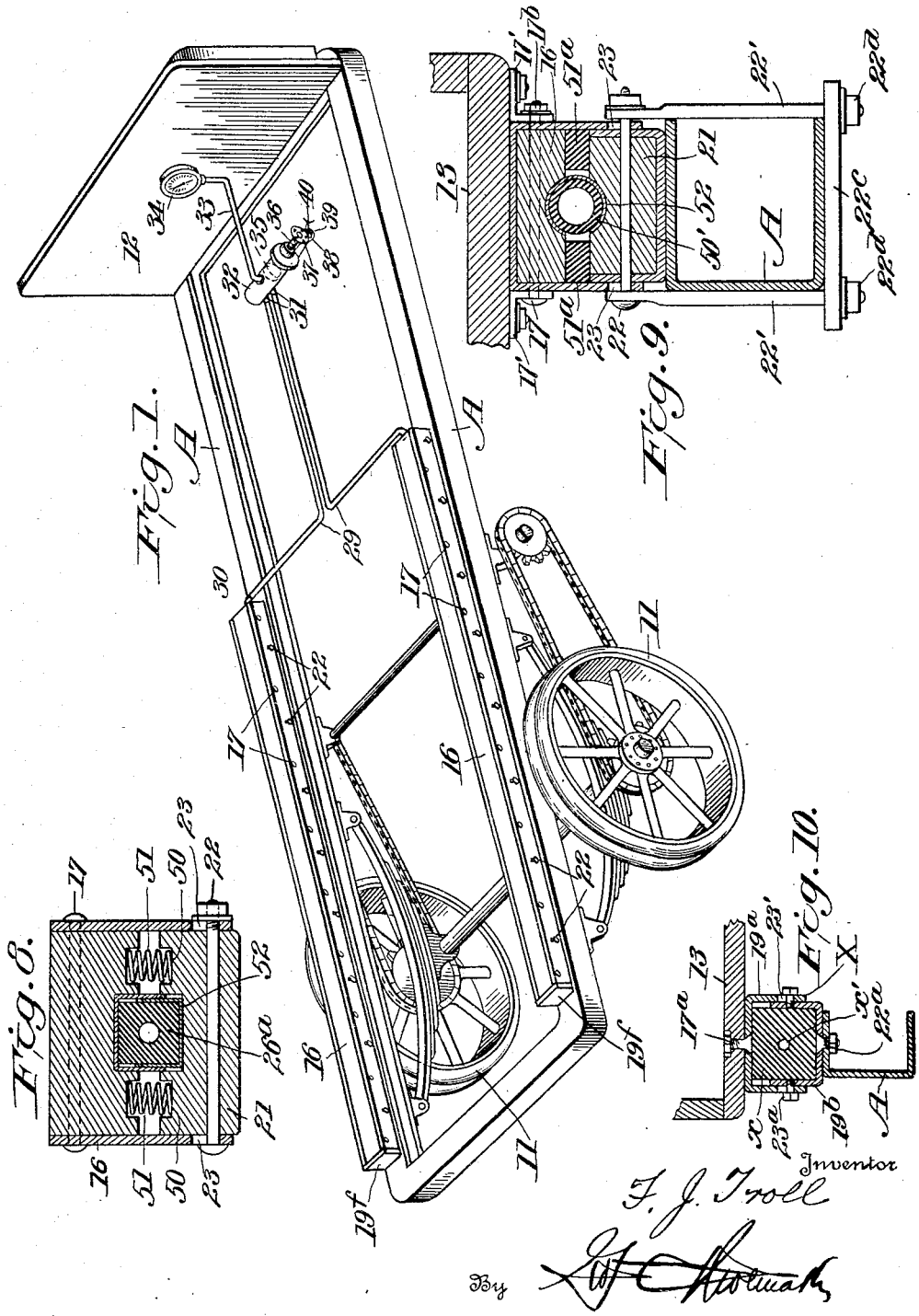

UNITED STATES PATENT OFFICE.

FREDERICK J. TROLL, OF BALTIMORE, MARYLAND, ASSIGNOR TO THE LOADOMETER COMPANY, OF BALTIMORE, MARYLAND.

LOAD-INDICATOR FOR VEHICLES.

1,227,506.

Specification of Letters Patent.

Patented May 22, 1917.

Application filed March 8, 1916. Serial No. 82,980.

*To all whom it may concern:*

Be it known that I, FREDERICK J. TROLL, a citizen of the United States, residing in the city of Baltimore and State of Maryland, have invented certain new and useful Improvements in Load-Indicators for Vehicles, of which the following is a specification.

This invention relates to a load indicator and controller for motor trucks or the like, and may be termed a loadometer.

Motor trucks are sometimes equipped with a sign disposed at some convenient point on the vehicle to indicate the pound capacity thereof. Warnings are also sometimes located on the vehicle to the effect that it should not be loaded to an extent beyond its rated carrying capacity, say for instance 3000 pounds. The reason for such notices and warnings is that overloads place the truck under unnecessary strain and impair the life of the truck. A cautious driver in some instances, in his efforts to exercise extreme care may underload the truck thereby reducing the operative efficiency by increasing the unit cost per pound of the materials handled. Careless drivers are likely to overload the truck, thereby increasing the repair cost, tire expense, etc., with the result that from the manufacturer's viewpoint, the reputation of the truck is affected to the disadvantage of the manufacturer by reason of complaints from owners or purchasers of motor trucks.

It is therefore one object of my invention to provide a means particularly adapted for application to motor trucks to indicate underloads and overloads in units of two hundred pounds more or less so that the rated capacity of the truck will not be abused or the operating efficiency reduced because of failure to load the truck to its rated capacity.

Another object resides in the provision of a fluid pressure means which may be readily applied to a motor truck and which will effectively operate so that the full load may always be carried and an underload or overload always known to the driver or other attendant.

Another object resides in the provision of an appliance readily applicable to a motor vehicle or other truck which embodies among other characteristics means whereby the total pounds handled may be indicated and when the weight capacity of the vehicle has been reached indication thereof may be made as may also an indication given of the number of times the vehicle has been overloaded.

With the above and other objects in view, the present invention consists in the combination and arrangement of parts hereinafter more fully described, illustrated in the accompanying drawings, and particularly pointed out in the appended claims, it being understood that changes may be made in the size, proportion and minor details without departing from the spirit or sacrificing any of the advantages of the invention.

In the drawings:—

Figure 1 is a perspective view illustrating a portion of a vehicle showing my invention applied thereto.

Fig. 2 is a side elevation of a vehicle illustrating an application of my invention thereto.

Fig. 3 is a fragmentary transverse sectional view through one side of the vehicle illustrating a portion of my invention in section.

Fig. 4 is an elevation of the gage with a part of the dial broken away.

Fig. 5 is a horizontal sectional view through the gage.

Fig. 6 is a transverse sectional view through one of the registering mechanisms illustrating one means for preventing backward movement of the registering disks.

Fig. 7 is a fragmentary transverse sectional view through one side of the vehicle illustrating a modification of the structure shown in Fig. 3.

Figs. 8, 9 and 10 are views similar to Figs. 3 and 7, illustrating modifications.

Referring now more particularly to the accompanying drawings, the reference character A indicates the frame of the chassis of a motor or other truck which is supported upon front and rear wheels 10 and 11 in the usual or any suitable manner and to which the dashboard 12 may be secured.

The character 13 indicates the platform or bottom of the truck body 14 which may extend from the rear of the driver's seat 15 to the rear of the frame A.

Secured adjacent opposite side edges of the under side of the bottom 13 of the truck are oppositely disposed upper sills 16. Any suitable means may be employed for the purpose of securing these sills in position but bolts 17 preferably extend transversely through the sills and through angle irons 17' secured to the bottom of the body by suitable fastenings 17$^a$, there being nuts 17$^b$ on the bolts 17 coöperating with locking washers 17$^c$ to prevent dislodgment of the nuts and bolts.

The sills 16 may be arranged transversely of the vehicle but are shown as extending from the rear of the driver's seat to the rear of the truck. In the under side of each sill there is formed a longitudinal groove 18, extending throughout the length of each sill.

The upper section 19 of a casing X may be fitted over each sill 16 and, if used, the bolts 17 will pass through the sides 19' of the same with said sides extending below the under side of the respective sills 16.

Disposed on opposite sides of the chassis frame are sills 21 preferably of the same length as the sills 16 and which extend partly into the aforesaid casing sections 19. Bolts or the like 22 pass transversely through the lower sills 21 and through slots 23 formed in the lower portion 19' of the casing section 19. The lower sills 21 may each have a casing 19$^a$ fitting around the bottom and sides thereof, and if this casing section is employed for the lower sills, the bolts 22 pass through the sides thereof with the casing sections 19 and 19$^a$ telescoping as shown.

The casing sections are formed of relatively thin metal, preferably sheet metal, and the lower sills and their casing sections may be secured to the chassis frame in any suitable manner. As shown, they are connected to the upper faces of the sides of said chassis frame by bolts 22' suspended from the ends of the aforesaid bolts 22 and extending down on opposite sides of the chassis frame. The upper ends of these bolts 22' have a loose connection with the bolts 22 and are held against disconnection from the latter by means of nuts 22$^a$ and the locking washers 22$^b$. The lower ends of the bolts 22' are shown as screw threaded and at their lower ends pass through plates 22$^c$ which are held clamped against the under side of the chassis frame by nuts 22$^d$ and their washers 22$^e$. By virtue of these connecting bolts 22' the lower sills 21 are held against lateral displacement with relation to the chassis frame and body, and where the casing X is employed, and the lower section of the casing being disposed within the upper section of the casing, it is clear that both the upper and lower sills are held against lateral displacement with relation to the chassis frame and body by reason of the bolt connections 22'.

The upper face of each lower sill is provided with a longitudinal recess 25 extending throughout the length thereof and preferably of the same formation as the recess 18 in the underside of the upper sills and preferably disposed in vertical alinement with the latter recesses. In the seats thus formed I dispose rubber or other compressible, yieldable or resilient elements 26 which preferably extend throughout the length of the respective sills. Each compressible element 26 may have a relatively small bore 27 which renders the same hollow without rendering the material thin between the bore and the outer circumference.

The compressible elements are adapted to contain air, liquid or other fluid of such nature as not to have an injurious effect on the material of which the compressible elements are composed so as not to impair the life of the material. The compressible elements 26 may be shielded from the weather by the aforesaid casing X and the end plates 19$^f$.

Caps, plugs or other suitable means may be employed to effectively close the outer ends of the compressible elements 26 in order to prevent the escape of fluid. Tubes 29 may be connected to the inner ends of the compressible elements 26 by means of suitable couplings 30.

A fluid reservoir 32 is carried by the vehicle and to which the tubes 29 may be secured by suitable nipples 31. A low pressure gage 34 of any suitable character may be mounted on the dashboard 12 of the vehicle in sight of the driver of the vehicle. The gage 34 has connection with the reservoir 32 by a pipe or other connection 33.

The fluid capacity of the reservoir 32 may be adjusted or varied, as desired, by means of a piston 35 mounted therein and provided with a screw threaded or other stem 36 which extends through one end of the reservoir. This screw threaded stem is provided with a hand wheel 37 which has openings therein. An arm 38 extends from the reservoir 32 and is provided in its outer end with an aperture 39 through which and one of the openings of the hand wheel 37 a seal 40 may be inserted for the purpose of locking the piston 35 in adjusted positions against manipulation and consequent adjustment by unauthorized persons. Any suitable means for locking the piston 35 against unauthorized adjustment may be employed.

Under the action of weight placed on the truck, the compressible elements 26 are depressed according to the weight placed on the body of the truck and this depression of the vehicle body and the consequent compression of the compressible elements 26 causes the fluid therein and also the fluid in the tubular members 29, the reservoir 32 and the pipe connection 33 to operate the Bourdon tube 31' in the gage 34 which effects actuation of the segmental gear 42 on the pivot 43. This segmental gear 42 is in mesh with the pinion 44 on the indicator hand shaft 45 and when it swings it causes the shaft 45 to rotate and consequently shifts the hand 46 over the dial face 47 of the gage 34 and thereby indicates on the dial face the total pounds or amount of load in units as the load is placed on the truck. The dial of the gage gives the rated capacity, say for instance 3000 pounds, although it is preferably graduated to indicate a greater rate of pounds capacity as shown. It also discloses a "zero" point and a "no load test point." The hand indicator point 46 should always point to this "no load test point" when the truck is unloaded.

There is maintained at all times an initial pressure on the system for should there be any leakage the indicator hand would drop below the "no load test point" toward the "zero" point. Should there be an extra amount of pressure from some source or other the hand indicator 46 would go above the "no load test point." The aforesaid adjustable reservoir 42 is provided for the purpose of adjusting the hand indicator so as to maintain the indicator hand pointed directly to the "no load test point" when the truck is unloaded. It may be mentioned at this point, for example, that if the truck has been loaded with 3000 pounds to be carried to a certain point and then 1000 pounds are removed from the truck, the indicator hand 46 will drop back to the 2000 pound mark. Then, if the truck is sent to another place and it has 600 pounds taken on, the indicator hand 46 will then indicate 2600 pounds. The additional 600 pounds and all loads taken on would be registered on a registering means, including the rotatable disks 48, held against backward movement, preferably by ratchets 48'. Should the truck be overloaded above a predetermined amount, say for instance, 1000 pounds overload, which would cause the hand indicator 46 to indicate 4000 pounds on the dial, this act of overloading would be registered on a register, including disks 49, held against backward movement by ratchets 49'.

One way in which the times the truck has been overloaded may be indicated is to provide the aforesaid beveled gear 67 with a projection or other tripping element 66 which is so disposed that when the gear 67 has been rotated to such an extent as to cause the indicator hand 46 to pass the predetermined amount of overload, as shown on dial 47, the trip 66 will engage the star wheel 66' and actuate the registering mechanism 49 indicating thereon the number of times the truck has been overloaded. The beveled gear may have a plurality of screw threaded walls 67' on its periphery so that the screw threaded tripping element 66 may be disposed therein interchangeably whereby the trip will engage the star wheel 66' at different times according to the hole in which the trip is placed, whereby the amount of overload to be reached and indicated may be adjusted. By means of the ratchets 49' the registering disks turn in one direction only under the action of registering the loads and cannot accidentally rotate backward.

While not essential to an effective operation of the present invention, the inner faces of the upper and lower sills of each pair may have alining sockets 50 to receive the ends of the helical springs or other yieldable elements 51 adapted to reinforce the compressible elements 26 in maintaining the upper and lower sills normally separated and to coact with the compressible elements 26 to support the body of the vehicle above the chassis frame. These yieldable elements 51 sustain practically all the weight of the body and its load, especially where the compressible elements are formed of tubing similar to the ordinary garden hose, as indicated at 50' in Fig. 7, and which form of compressible elements may be readily substituted for the form of compressible elements shown in Figs. 1 to 3, inclusive, if the springs or other yieldable elements 51 are used in the structure. In this connection the form of yieldable elements 51 may be varied and in fact the characteristics of the yieldable elements may be in the form of rubber or similar yieldable elements arranged on opposite sides of the compressible element between each pair of sills, as illustrated in Fig. 9. Also in this connection it may be noted that the compressible elements need not necessarily be of circular form in cross section for, as illustrated at 26ª in Fig. 8, these yieldable elements may be rectangular in cross section indicating that the general contour in cross section of the yieldable elements may be varied and this is contemplated to an extent even beyond the cross sectional contours illustrated and described herein.

From the foregoing it will be understood that in all of the forms of the invention illustrated I contemplate using springs or other yieldable elements between each pair of sills on opposite sides of the respective compressing elements. It will be understood, however, that in practice, there are instances where these springs or other yieldable elements on opposite sides of the compressible elements may be dispensed with in the use of my invention. Whether the springs or other yieldable elements on opposite sides of the compressible elements are dispensed with, I may inclose each compressible element within a longitudinally split pressed steel or other sleeve 52. My invention need not necessarily include the split sleeve 52 but, as stated, the same may be used, and if employed, will practically completely embrace the respective compressing element and on account of the longitudinal slit in the sleeve the same will give to permit of compression of the compressible elements under the influence of weight placed on the body of the vehicle. The sleeve 52 among other characteristics serves to further protect the compressible elements from climatic conditions and reinforces and strengthens the same.

As shown in Fig. 10, I may dispense with the upper and lower sills 16 and 21 and arrange within the sectional casing X a solid piece of rubber or other yieldable material $x$ which has a bore $x'$. The element $x$ forms the fluid containing element which may be substituted for any of the other forms described and the casing in which same is inclosed is the same in form as the casing X hereinbefore described and in which the casing section $19^a$ may be secured to the bottom 13 of the body by suitable fastenings $17^a$ instead of the aforesaid brackets $17'$. The lower casing section $19^b$ may be secured to the chassis by suitable fastenings $22^a$ instead of by the aforesaid bolts $22'$. The casing sections $19^a$ and $19^b$ telescope, as shown, and the latter has slots $23'$ into which the projections $23^a$ of the casing section $19^a$ project and slide incident to compression of the fluid containing elements $x$. The projections $23^a$ may be in the form of lag screws having screw-threaded connection with the lower casing section $19^b$.

What is claimed is:—

1. The combination of a vehicle chassis and a body, pairs of upper and lower sills interposed between the body and the chassis, a fluid pressure containing element interposed between each pair of sills, sets of springs interposed between each pair of sills on opposite sides of the respective fluid containing elements, the latter and the springs being compressible under the influence of weight placed on the body, a yieldable longitudinally split sleeve embracing each fluid pressure containing element, a gage carried by the vehicle, and connections between said fluid containing elements and the gage whereby the weight placed on the body may be indicated on the gage.

2. The combination of a vehicle chassis and a body, pairs of upper and lower sills interposed between the body and the chassis, a fluid pressure containing element interposed between each pair of sills, yieldable means between each pair of sills on opposite sides of the respective fluid pressure containing elements, the latter and said yieldable means being compressible under the influence of weight placed on the body, a yieldable longitudinally split sleeve embracing each fluid pressure containing element, a gage carried by the vehicle, and connections between the fluid containing elements and the gage whereby the weight placed on the body may be indicated on the gage.

3. The combination of a vehicle chassis and a body, pairs of upper and lower longitudinally disposed sills interposed between the body and the chassis on opposite sides thereof, a fluid pressure containing element interposed between each pair of sills and which is compressible under the influence of weight placed on the body, a yieldable longitudinally split sleeve embracing each fluid pressure containing element, springs between each pair of sills, a gage carried by the vehicle, and connections between the fluid containing elements and the gage whereby the weight placed on the body may be indicated on the gage.

4. The combination of a vehicle chassis and a body, pairs of upper and lower longitudinally disposed sills interposed between the body and the chassis on opposite sides thereof, a fluid pressure containing element interposed between each pair of sills and which is compressible under the influence of weight placed on the body, yieldable means separate from the fluid containing elements between the sills, a yieldable longitudinally split sleeve embracing each fluid pressure containing element, a gage carried by the vehicle, and connections between the fluid containing elements and the gage whereby the weight placed on the body may be indicated on the gage.

5. The combination of a vehicle chassis and a body, pairs of upper and lower longitudinally disposed sills interposed between the body and the chassis on opposite sides thereof, a fluid pressure containing element interposed between each pair of sills and which is compressible under the influence of weight placed on the body, means between the sills to reinforce the fluid containing elements in the support of the body, a yieldable longitudinally split sleeve embracing each fluid pressure containing element, a gage carried by the vehicle, and connections between the fluid containing elements and the gage whereby the weight placed on the body may be indicated on the gage.

6. The combination of a vehicle chassis and a body, pairs of upper and lower sills interposed between the body and the chassis, a fluid pressure containing element interposed between each pair of sills, means between each pair of sills to reinforce the fluid containing elements in the yieldable support of the body, said reinforcing means and the fluid containing elements being compressible under the influence of weight placed on the body, a yieldable longitudinally split sleeve embracing each fluid pressure containing element, a gage on the vehicle, and connections between the fluid containing elements and the gage whereby the weight placed on the body may be indicated on the gage.

7. The combination with a vehicle chassis and a body, of compressible elements interposed between the chassis and the body, sets of yieldable elements interposed between the chassis and the body on opposite sides of said compressible elements, a yieldable longitudinally split sleeve embracing each of said compressible elements, a gage, connections between the compressible elements and the gage, a reservoir in the line of said connections, said compressible elements and connections and the reservoir adapted to contain a fluid, and means for varying the fluid capacity of said reservoir.

8. The combination of a vehicle including a body and a chassis, means for yieldably supporting the body so that it may be subject to depression under the influence of weight placed thereon, fluid pressure means interposed between the body and the chassis, sets of yieldable elements interposed between the body and the chassis on opposite sides of the fluid pressure means, a yieldable longitudinally split sleeve embracing the fluid pressure means to yield with the latter, an indicator carried by the vehicle, and connections between the fluid pressure means and the gage to indicate when the weight capacity of the vehicle has been reached.

9. The combination of a vehicle including a body and a chassis, means for yieldably supporting the body so that it may be subject to depression under the influence of weight placed thereon, fluid pressure means interposed between the body and the chassis, sets of yieldable elements interposed between the body and the chassis on opposite sides of the fluid pressure means, a yieldable longitudinally split sleeve embracing the fluid pressure means to yield with the latter, an indicator carried by the vehicle, connections between the fluid pressure means and the gage to indicate when the weight capacity of the vehicle has been reached, and means for increasing and decreasing the capacity of said fluid pressure means.

10. The combination of a vehicle chassis and a body, of fluid pressure means interposed between the chassis and the body, springs interposed between the chassis and the body on opposite sides of the fluid pressure means, a longitudinally split yieldable member embracing the fluid pressure means to yield with the latter, and means having operative connection with said fluid pressure means to indicate when the weight capacity of the vehicle has been reached.

11. The combination of a vehicle chassis and a body, of fluid pressure means interposed between the chassis and the body, springs interposed between the chassis and the body on opposite sides of the fluid pressure means, a longitudinally split yieldable member embracing the fluid pressure means to yield with the latter, means having operative connection with said fluid pressure means to indicate when the weight capacity of the vehicle has been reached, and means operable to indicate the number of times the vehicle has been overloaded.

12. The combination with a vehicle chassis and a body, of fluid pressure means carried by the vehicle, springs interposed between the chassis and the body on opposite sides of the fluid pressure means, a longitudinally split yieldable member embracing the fluid pressure means to yield with the latter, and a gage carried by the vehicle and connected to the fluid pressure means to indicate the total pounds carried by the vehicle and to indicate when the weight capacity of the vehicle has been reached.

13. The combination with a vehicle chassis and a body, of fluid pressure means carried by the vehicle, springs interposed between the chassis and the body on opposite sides of the fluid pressure means, a longitudinally split yieldable member embracing the fluid pressure means to yield with the latter, a gage carried by the vehicle and connected to the fluid pressure means to indicate the total pounds carried by the vehicle and to indicate when the weight capacity of the vehicle has been reached, and means to indicate the number of times the vehicle has been overloaded.

14. The combination with a vehicle chassis and a body, of upper and lower longitudinally disposed sills interposed between the body and the chassis on opposite sides thereof, fluid pressure containing elements interposed between the sills on opposite sides of the vehicle and which are compressible under the influence of weight placed on the body, yieldable elements interposed between the sills on opposite sides of the fluid pressure containing elements, and longitudinally split tubular members embracing the yieldable elements to yield with the latter, a gage carried by the vehicle, and connections between the fluid pressure containing elements and the gage whereby the weight placed upon the body may be indicated.

15. In a vehicle including a chassis frame and a resiliently supported body, a fluid pressure means independent of the resilient body supporting means operable by the relative movement of the body and the chassis frame, yieldable elements co-acting with the fluid pressure means to yieldably support the body independently of the resilient body supporting means, longitudinally split tubular members embracing the yieldable elements to yield with the latter, and a gage operated by the fluid pressure means to indicate the amount of said relative movements between the body and said chassis frame.

16. In a vehicle including a chassis frame and a body, relatively long compressible fluid containing elements disposed between the chassis frame and the body along opposite sides thereof and arranged longitudinally of the same, yieldable elements disposed on opposite sides of the fluid containing elements, longitudinally split yieldable members embracing the fluid containing elements to reinforce the latter, a gage on the vehicle, and connections between said compressible elements and the gage whereby the gage is operated under the influence of weight placed on said body.

17. In a vehicle, a chassis frame and a body, means interposed between the frame and body to yieldably support the body on the frame including a fluid containing element and yieldable elements arranged on opposite sides of the fluid containing element, a longitudinally split sleeve yieldingly embracing the fluid containing element to reinforce and yield with the latter, a gage on the vehicle, and connections between the gage and said yieldable element whereby the gage is operated under the influence of weight placed on the body.

18. The combination of a vehicle body and a chassis frame, coöperating pairs of sills interposed between the chassis frame and the body, each pair of sills being arranged longitudinally of the chassis frame and body, yieldable means arranged between each pair of sills, including sets of springs and a fluid containing element between each set of springs, a longitudinally split sleeve yieldingly embracing the fluid containing element to reinforce and yield with the latter, a gage carried by the vehicle, and connections between the fluid containing elements and the gage to operate the latter under the influence of weight placed on or removed from said body.

19. The combination of a body, sills secured to the under side of the body, a sill supported under each of the aforesaid sills for coöperation with the first-named sills, yieldable means arranged between the coöperating sills and maintaining the coöperating sills normally spaced apart, said yieldable means adapted to contain a fluid, other yieldable elements arranged between the coöperating sills to coöperate with the aforesaid yieldable means to hold the sills normally spaced apart, a longitudinally split sleeve yieldably embracing said fluid containing part of the yielding means to reinforce and yield with the latter, a gage, and fluid containing and conveying connections between the yieldable fluid containing means and a gage to operate the latter upon compression of said yieldable means and yieldable elements incident to weight placed upon the body.

20. The combination of a vehicle including a chassis frame and a body including a driver's seat, means arranged between the chassis frame and the body and extending from the rear of the driver's seat to the rear of the body to cushion the latter, said means including a fluid containing element and yieldable elements on opposite sides of the fluid containing element, a longitudinally split sleeve yieldably embracing said fluid containing part of the yielding means to reinforce and yield with the latter, a gage on the vehicle, and fluid containing and conveying connections between the fluid containing element and the gage to operate the latter upon downward movement of the body against said yieldable means incident to weight placed on the body.

21. The combination of a vehicle chassis and a body, a fluid pressure containing element interposed between the chassis and the body, a longitudinally split sleeve yieldingly embracing the fluid pressure containing element, a gage carried by the vehicle, and connections between said fluid containing element and the gage whereby the weight placed on the body may be indicated on the gage.

22. The combination of a vehicle chassis and a body, a fluid pressure containing element interposed between the body and the chassis, a longitudinally split sleeve yieldably embracing the fluid pressure containing element, the yieldable elements coacting with the fluid pressure containing element, the latter and the said yieldable elements being compressible under weight placed on the body, a gage carried by the vehicle, and connections between said fluid containing element and the gage whereby the weight placed on the body may be indicated on the gage.

23. The combination of a vehicle chassis and a body, pairs of upper and lower sills interposed between the body and the chassis, a fluid pressure containing element interposed between each pair of sills, sets of yieldable elements between each pair of sills on opposite sides of the respective fluid containing elements, the latter and the said yieldable elements being compressible under the influence of weight placed on the body, a gage carried by the vehicle, and connections between said fluid containing elements and the gage whereby the weight placed on the body may be indicated on the gage.

24. The combination of a vehicle chassis and a body, pairs of upper and lower sills interposed between the body and the chassis, a fluid pressure containing element interposed between each pair of sills, sets of yieldable elements interposed between each pair of sills on opposite sides of the respective fluid containing elements, the latter and the springs being compressible under the influence of weight placed on the body, a casing completely inclosing the pairs of sills and respective fluid pressure containing elements, said sills being movable toward and away from each other within the casing, means for detachably securing the casing to the body of the vehicle, and means for detachably securing the casing to the chassis.

25. The combination with a chassis and a vehicle body, of a load indicator comprising fluid operated indicating means and fluid containing, compressible, operating, members interposed between the chassis and the body, said members having walls formed of a thickness to support the body in spaced relation to the chassis in the absence of fluid in said members, and a yieldable longitudinally split sleeve embracing each of said members.

26. The combination of a vehicle chassis and a body, of fluid pressure means interposed between the chassis and the body, a sectional casing to completely inclose the fluid pressure means, a gage carried by the vehicle, and means having operative connection with the fluid pressure means and the gage to indicate when the weight capacity of the vehicle has been reached, the sections of the casing being movable one within the other under the action of the fluid pressure means.

27. The combination of a vehicle chassis and a body, upper and lower sills interposed between the body and the chassis, a fluid pressure containing element interposed between the upper and lower sills, a casing section embracing each sill, the casing section of one sill being slidable on the other, a gage carried by the vehicle, and connections between the gage and the fluid containing element whereby the weight placed on the body may be indicated on the gage.

28. The combination of a vehicle chassis and a body, upper and lower sills interposed between the body and the chassis, a fluid pressure containing element interposed between the upper and lower sills, a casing section embracing each sill, the casing section of one sill being slidable on the other, a longitudinally split member reinforcing and yieldably embracing the fluid containing element, a gage carried by the vehicle, and connections between the gage and the fluid containing element whereby the weight placed on the body may be indicated on the gage.

29. The combination of a vehicle chassis and a body, upper and lower sills interposed between the body and the chassis, a fluid pressure containing element interposed between the upper and lower sills, a casing section embracing each sill, the casing section of one sill being slidable on the other, a longitudinally split member reinforcing and yieldably embracing the fluid containing element, yieldable elements between the sills on opposite sides of the fluid containing element to coact with the latter and said sleeve, a gage carried by the vehicle, and connections between the gage and the fluid containing element whereby the weight placed on the body may be indicated on the gage.

30. The combination with a chassis and a vehicle body, of a load indicator comprising fluid operated indicating means and fluid containing, compressible, operating, members interposed between the chassis and the body, said members having walls formed of a thickness to support the body in spaced relation to the chassis in the absence of fluid in said members, a yieldable longitudinally split sleeve embracing each of said members, and sets of yieldable elements interposed between the chassis and the body on opposite sides of each of said members.

31. The combination with an upper load carrying member and a lower member, of a fluid operated load indicating means, a fluid containing, operating, compressible, load supporting member interposed between said upper and lower members, said supporting member having walls constructed to support the load independently of the presence of fluid therein, and a yieldable longitudinally split sleeve embracing said supporting member.

32. The combination with an upper load carrying member and a lower member, of a fluid operated load indicating means, a fluid containing, operating, compressible, load supporting member interposed between said upper and lower members, said supporting member having walls constructed to support the load independently of the presence of fluid therein, a yieldable longitudinally split sleeve embracing said supporting member, and yieldable elements interposed between the chassis and the body on opposite sides of said supporting member.

33. The combination with a chassis and a vehicle body, of a load indicator comprising indicating means and an operating, compressible, supporting member interposed between the chassis and the body and constructed to contain an incompressible liquid, said member having walls formed of a thickness to support the body in spaced relation to the chassis independently of the presence of liquid in said member, and a yieldable sleeve embracing said supporting member.

34. The combination with a chassis and a vehicle body, of a load indicator comprising a fluid containing load indicating means and a fluid containing operating member interposed between the chassis and the body and connected to the load indicating means and operable to varying degrees of compression, according to loads placed on the body, to operate the indicating means, said member being capable of supporting the body under the same varying degrees of compression as aforesaid, incident to varying loads in the absence of fluid in said member, and a yieldable sleeve embracing said member.

35. The combination with a chassis and a vehicle body, of a load indicator comprising indicating means and a fluid containing, compressible, operating member interposed between the chassis and the body, said member having walls constructed to support the body in operative position on the chassis in the absence of fluid in said member, a yieldable sleeve embracing said member, and means for inclosing said member and said sleeve.

36. The combination of a chassis and a vehicle body, of an indicating means including devices to indicate when the weight capacity of the vehicle has been reached, the total weight carried by the vehicle and the number of times the vehicle is overloaded, a fluid containing, compressible member interposed between the chassis and body to operate said indicating means, said member being constructed to support the body independently of the presence of fluid therein, and a split sleeve embracing said member.

37. In a load indicator, the combination of a chassis, a vehicle body, indicating means having as one element thereof a compressible fluid containing body-supporting member disposed between the chassis and the vehicle body and capable of supporting the body yieldably in the absence of fluid therein, and a sleeve embracing said member.

38. In a load indicator, the combination of a chassis, a vehicle body, indicating means having as one element thereof a compressible fluid containing body-supporting member disposed between the chassis and the vehicle body and capable of supporting the body yieldably in the absence of fluid therein, a split sleeve embracing said member, and sets of yieldable elements interposed between the chassis and the body adjacent said member and sleeve.

39. In a load indicator, the combination of a chassis, a vehicle body, an indicating means having as one element thereof a fluid containing, compressible, body-supporting member disposed between the chassis and the vehicle body and constructed to support the body independently of operative connection with the indicating means, and a split yieldable sleeve embracing said member.

40. In a load indicator, the combination of a chassis, a vehicle body, an indicating means having as one element thereof a fluid containing, compressible, body-supporting member disposed between the chassis and the vehicle body and constructed to adequately support the vehicle body independently of operative connection with the indicating means, means controlled by said member for actuating the indicating means, and a split yieldable sleeve embracing said member.

41. The combination with a chassis and a vehicle body, of a load indicator comprising an indicating means, means to operate the indicating means according to varying loads placed on the body, including a member formed of compressible material disposed between the chassis and body and whose walls are constructed to support the body yieldably in normal operative position under varying loads on the chassis independently of operative connection with the indicating means, and a yieldable element embracing said member.

42. The combination with a chassis and a vehicle body, of a load indicator comprising an indicating means, means to operate the indicating means according to varying loads placed on the body, including a member formed of compressible material disposed between the chassis and body and whose walls are constructed to support the body yieldably in normal operative position under varying loads on the chassis independently of operative connection with the indicating means, and a split yieldable sleeve embracing said member.

43. The combination with a chassis and a vehicle body, of a load indicator comprising an indicating means, means to operate the indicating means according to varying loads placed on the body, including a member formed of compressible material disposed to support the body yieldably in normal operative position under varying loads on the chassis independently of operative connection with the indicating means, and yieldable elements interposed between the chassis and body adjacent said member.

In testimony whereof I affix my signature in the presence of two witnesses.

FREDERICK J. TROLL.

Witnesses:
JOHN H. SIGGERS,
GEO. C. SHOEMAKER.

Copies of this patent may be obtained for five cents each, by addressing the "Commissioner of Patents, Washington, D. C."